INVENTORS
CHARLES H. McGRATH
AND ROGER L. WEBSTER
BY Walter H. Pumphrey
ATTORNEY April 22, 1952 C. H. McGRATH ET AL 2,593,779
KNOCKDOWN BOX AND CRATE
Filed March 16, 1950 5 Sheets-Sheet 5

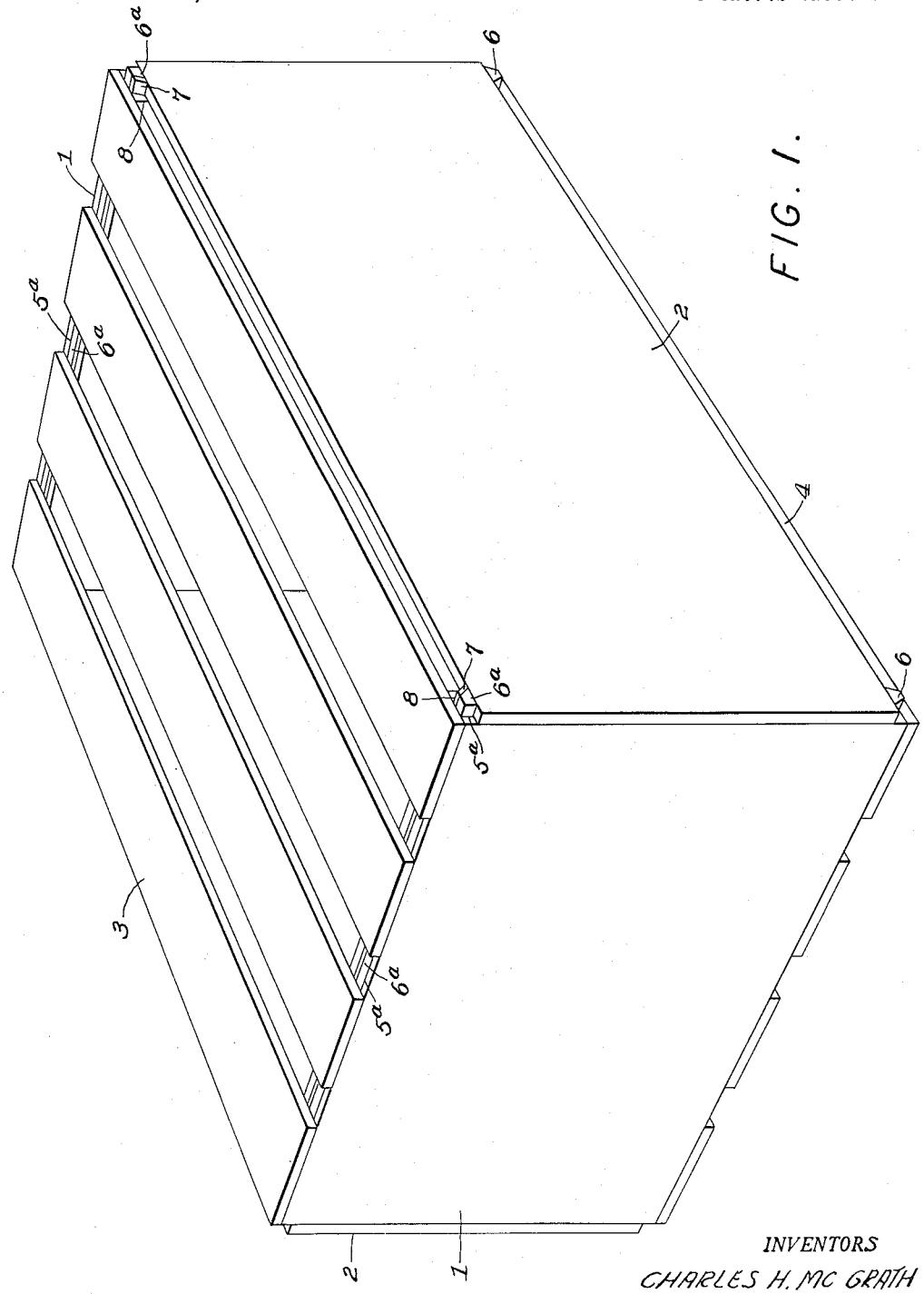

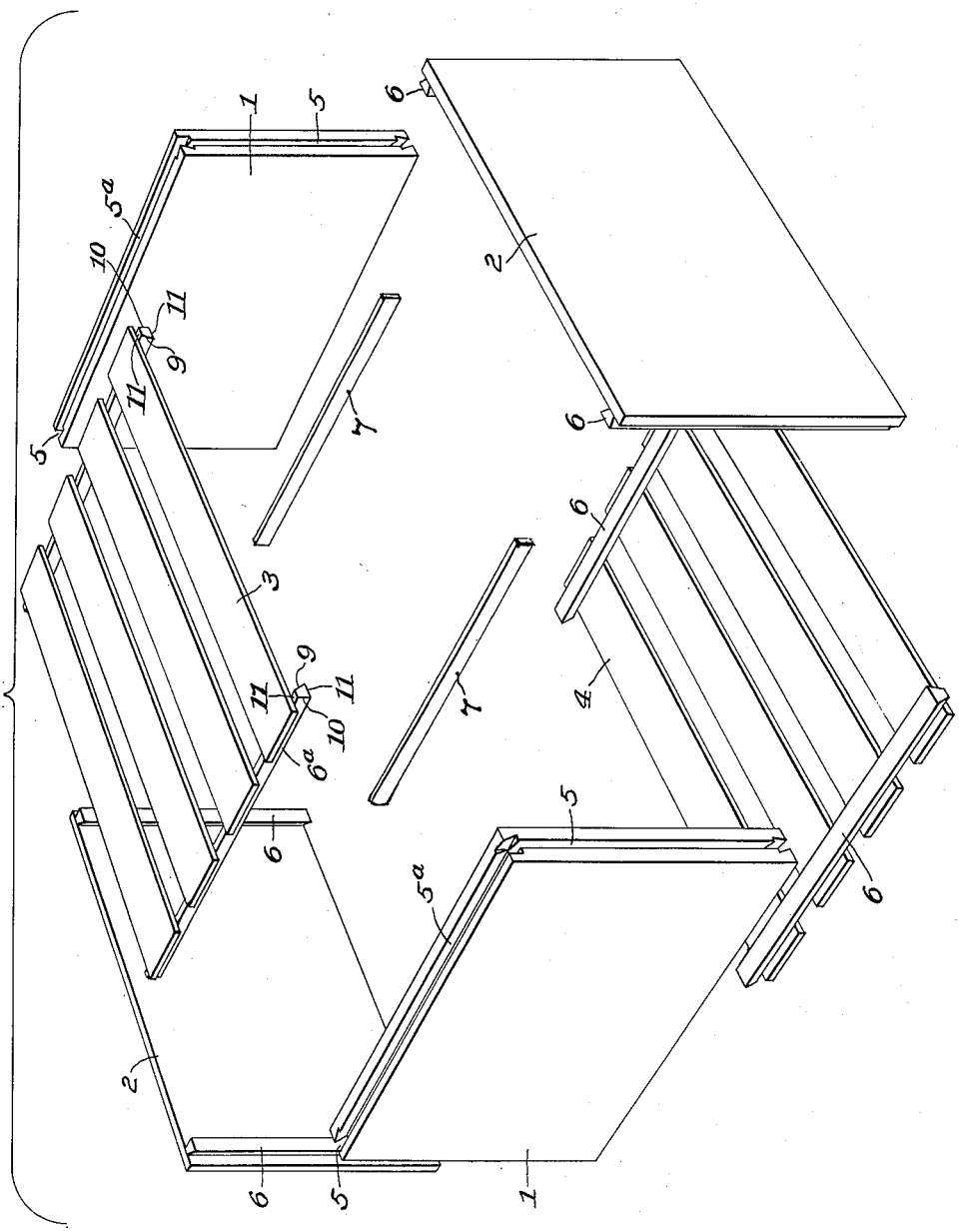

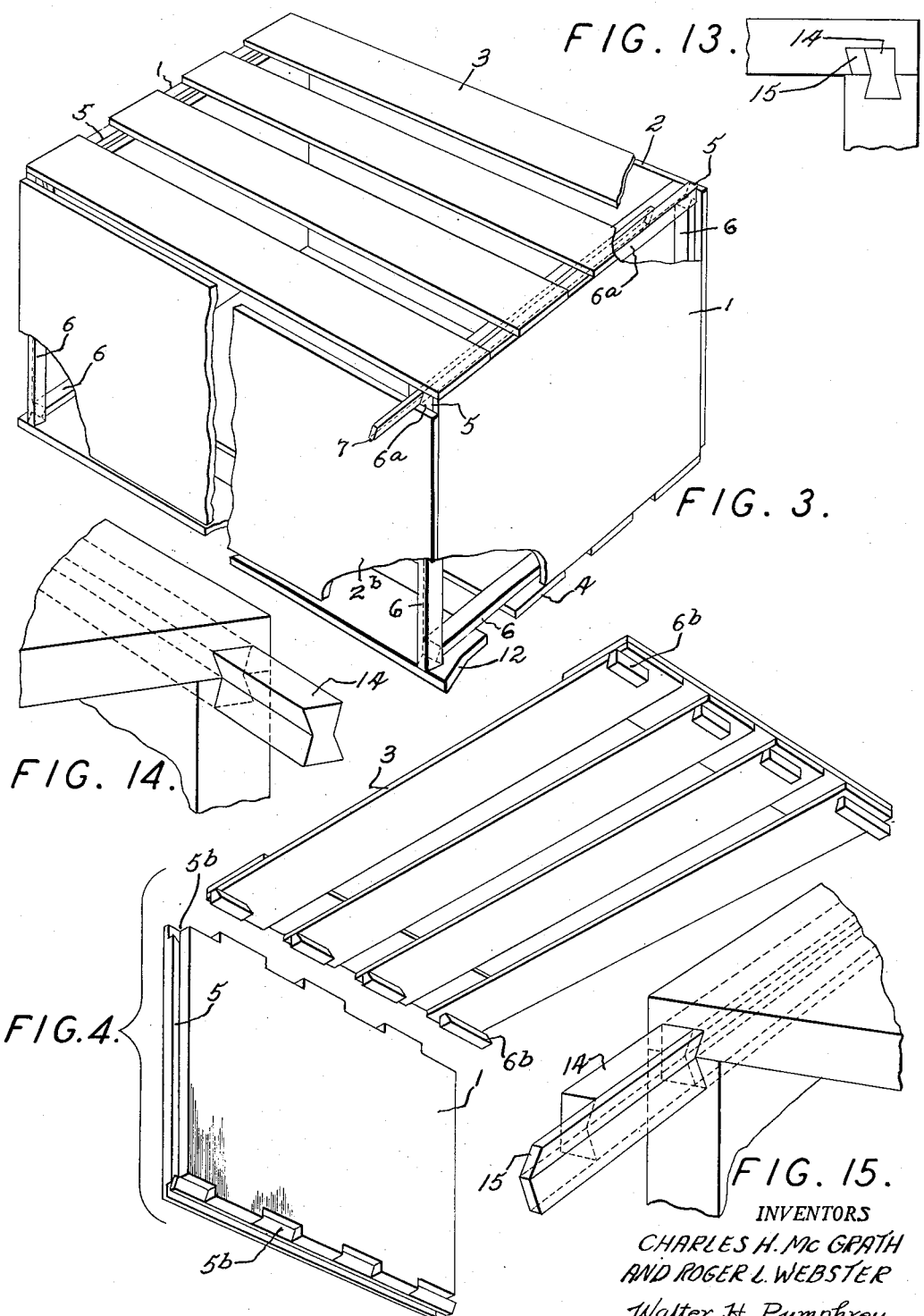

INVENTORS
CHARLES H. McGRATH
AND ROGER L. WEBSTER

BY Walter H. Pumphrey
ATTORNEY

Patented Apr. 22, 1952

2,593,779

UNITED STATES PATENT OFFICE 2,593,779

KNOCKDOWN BOX AND CRATE

Charles H. McGrath, New York, and Roger L. Webster, Elmhurst, N. Y.

Application March 16, 1950, Serial No. 149,976

8 Claims. (Cl. 217—65)

This invention relates to shipping crates and boxes of the knockdown type; also to various other structures, and particularly to the form and construction of the joints by which the top and other selected members of the crates, boxes and other structures are releasably secured in assembled relation.

The common practice in packing fruit and vegetables for shipment, such, for example, as citrus fruit, apples and the like, is to overfill the crates and the contents, when projecting above the top of the crate, present an obstruction that bars the use of a rigid sliding cover, which could otherwise be used, and requires sufficient flexibility in the cover to enable it to be bowed over the obstruction and pressed down at opposite ends to contact the ends of the crate, to which it is ordinarily nailed or wired.

The object of the invention in crate construction, is to meet the above requirements without the use of nails or wiring, and we accordingly provide a releasable tongue and groove lock joint for the flexible top cover member to secure it at each end of the crate. The joints are preferably of such form that engagement is effected by pressing the tongues, carried by the cover, downward under pressure from above, into the grooves in the thickened end members and securing them therein by key locking strips, inserted in the ends of the grooves, between adjoining sides of the same and the engaged tongues. Release of the top is effected by withdrawing the locking keys from the grooves.

For ordinary purposes, the other members of the crate may be releasably secured in assembled relation by tongue and groove joints of dovetail or other type but, if preferred, the above described lock joint may be employed throughout the crate and this applies as well to a solid wall box, as distinguished from a slatted crate.

A further object is to give a finished appearance to a solid wall box, by concealing the joints and bringing the exposed surfaces of the several members that make up the sides and ends of the box, into flush relation with each other and with the edges of the top and bottom members. This is accomplished by extending the top, bottom and sides in overlapping relation with the ends, to come flush with the outer surface thereof.

A further feature contributing to the appearance of the box and which serves to reinforce the action of the joints in securing the members in assembled relation and against disengagement, is the provision of an inner bevel on all meeting edges of the members that make up the box. In addition to interlocking the members, beveling the meeting edges avoids exposure of the crosscut ends of the box material and presents a continuous unbroken outer surface for each member.

Other features of the invention not specially mentioned above, will be brought to attention in the detailed description that follows.

The accompanying drawings will serve to illustrate several preferred embodiments of the invention but it will be understood that no limitations are intended by this showing other than are imposed by the appended claims.

In the drawings—

Fig. 1 is a perspective view showing a fruit and vegetable shipping crate constructed in accordance with the invention.

Fig. 2 is an exploded view showing in perspective, the various parts or members that make up the crate.

Fig. 3 is a perspective view showing a modification of the crate construction.

Fig. 4 is a similar view of a further modification.

Figs. 13, 14 and 15 are detail sectional views, illustrating modified forms of tongue and groove joints.

Figure 5:
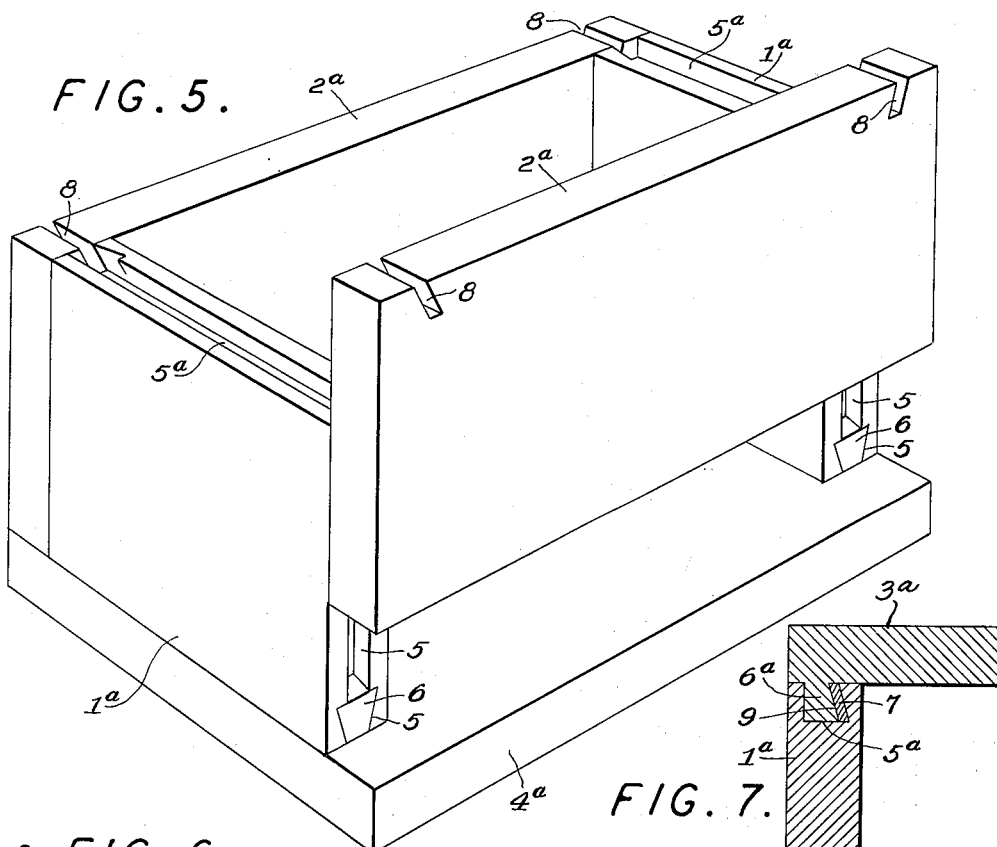
Fig. 5 is a view in perspective of a solid walled box, embodying the invention.

Referring now to the drawings, Figs. 1 to 4, inclusive, show knockdown types of a shipping crate, for apples or other fruits or vegetables, made up of thickened ends 1, 1, comparatively thin sides 2, 2 and slatted top and bottom members 3 and 4.

The above mentioned crate members may be made of any preferred material, in one piece, laminated or otherwise formed and suitably reinforced, if required, at or near the edges and at intermediate points, by strengthening strips.

Excepting the top or cover 3, the crate members are secured together in assembled relation by releasable joints of conventional form, such as tongue and groove joints of dovetail or other type, but, if preferred, any one of the hereinafter described tongue and groove lock joints may be employed for selected members or throughout the entire crate.

Assuming the conventional form of dovetail joint to be used, the end members 1, 1 are edge-grooved, substantially centrally of the inner and outer surfaces thereof, on all four sides, as indicated at 5, and the other members are provided with tongues 6, secured fast to the same or integrally formed and suitably proportioned to slidingly enter the grooves from either end thereof.

The tongues of the sides and bottom are thus entered in the grooves of the end members in the above stated manner, by insertion from either end thereof but this method of assembly, which would otherwise be followed, is barred for securing the top or cover member to over-filled crates, as previously stated, as the fruit or vegetables projecting above the top thereof present an obstruction which necessitates bowing the cover member over the same and securing it at opposite ends to the end members of the crate.

The required flexibility is given the top or cover member 3, by forming the same of thin slats extending lengthwise thereof and, at or near opposite ends, transversely of the slats, tongues 6ª are shaped and proportioned in cross section, to enter the grooves 5ª in the upper edge of the end members, from the top thereof, under downward pressure applied from above and are secured in the grooves by key locking strips 7, which are entered in close relation between adjoining sides of the grooves and tongues therein, openings or clearance, indicated at 8, being provided in the side members in line with the grooves, through which the locking strips are entered.

Preferably the grooves 5ª and tongues 6ª in cross section are approximately trapezoidal in form, with one outwardly inclined side, as indicated at 9, the opposite side 10, being at right angles to the parallel lines 11 of the top and bottom. The locking strip 7, which is entered between the adjoining outwardly inclined sides of the groove and tongue therein, is, in effect, a divisional lengthwise section of the inclined side of the tongue 6ª, being preferably in the form of a thin strip of wood or other material, proportioned to cooperate in close relation with the tongue to fill the groove but being removable to enable the crate members to be disconnected at will. If desired, the above described lock joint may also be employed for the bottom and other members, as previously stated.

Preferably, the sides and the top and bottom members are extended beyond the tongues thereon, to overlap the meeting edges of each other and of the end members and come flush with the outer surface on all sides, as shown in Fig. 3. Thus formed, the tongue and groove joints are concealed and the members are securely interlocked in assembled relation and against disengagement.

The view of the modification in Fig. 3, shows the side member of the crate depressed to provide clearance for the locking strip, shown partially inserted, which serves to secure the cover. It also shows the several members of the crate meeting in overlapping relation at the edges, as above described and the tongues of the sides overlapping the tongues of the bottom, to interlock the members against disengagement.

Depending upon whether the contents project above or come about flush with the top of the crate, the tongues of the cover may be entered from above in the grooves of the end members or inserted in the ends of the same. If the latter method is followed, one of the side members at one end of the crate, indicated at 2ᵇ, which, in the normal assembly partially overlaps the ends of the top grooves in the end members, is depressed or forced downward by suitably applied pressure, to clear the ends of the grooves for insertion therein of the cover tongues and locking strips. Upon release of the side member, the resilient outer edge portion of the bottom slat, which is bent downward when the side member is depressed, as indicated at 12, reacts, aided, if necessary, by applied pressure, and forces the side member upward to partially overlap the ends of the cover tongues and locking strips in the grooves of the end members and secures them in position.

The view of the modification in Fig. 4, shows the tongues 6ᵇ of the cover and bottom members formed in sections of a length about the width of the slats, to which they are attached and the inner wall of the top and bottom grooves in the end members cut away, as indicated at 5ᵇ, to admit lateral entrance therein of the sectional tongues, which, when entered, are secured by locking strips, inserted in the open ends of the grooves.

As the assembly of the crate will be apparent from the foregoing, it will not be necessary to describe the same in further detail.

Figure 7:
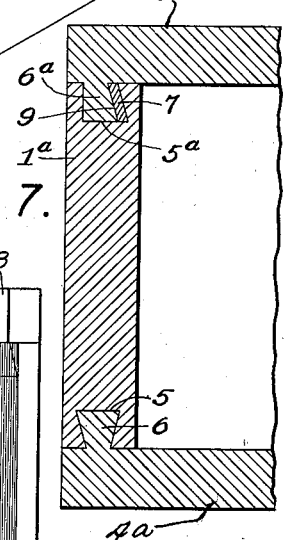
Fig. 7 is a vertical section on the line $s^7$—$s^7$, of Fig. 6.
Figure 6:
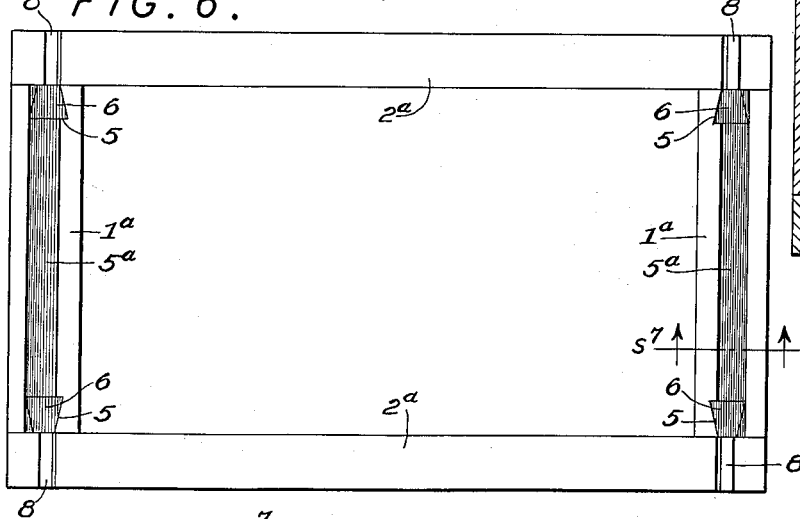
Fig. 6 is a top plan view of the box with the cover removed.
Figures 8, 9:
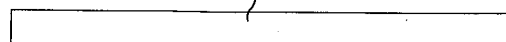
Figs. 8 and 9 are views in side and end elevation, respectively, of the key locking strip.
Figure 10:
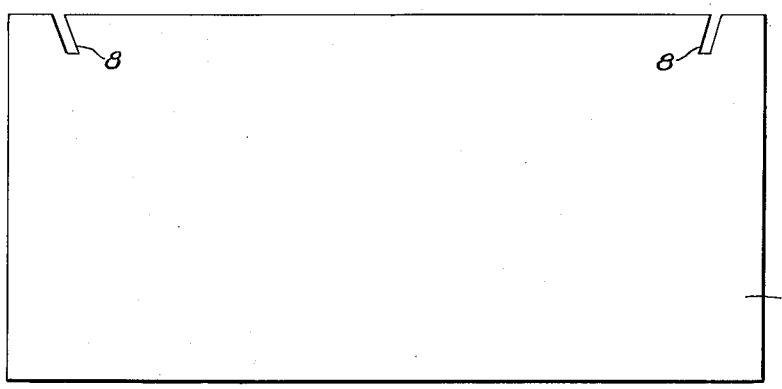
Fig. 10 is a view in elevation of one of the side members of the box shown in Figs. 11 and 12.
Figure 11:
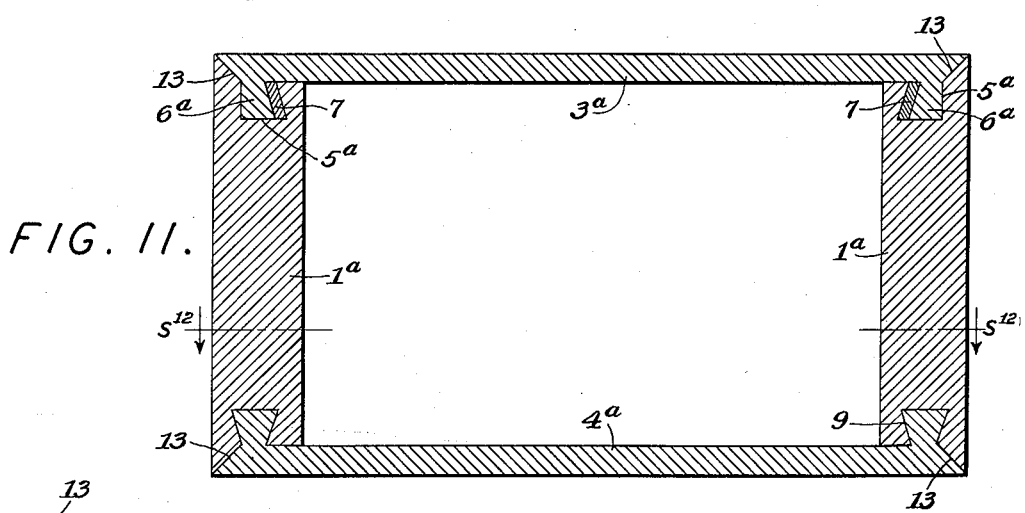
Fig. 11 is a vertical section, showing an inner bevel on the meeting edges of the box members.
Figure 12:
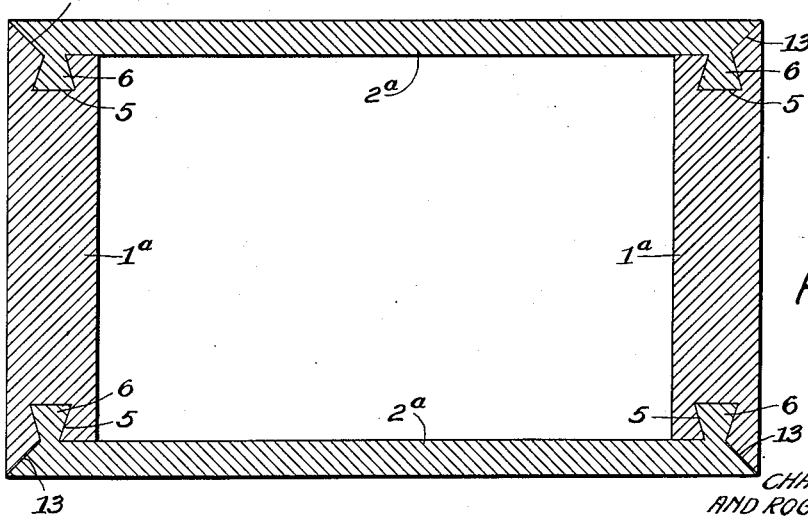
Fig. 12 is a horizontal section on the line $s^{12}$—$s^{12}$, of Fig. 11.

Referring to Figs. 5 to 10, inclusive, a solid walled box is shown and as the ends 1ª, 1ª, sides 2ª, 2ª, and the top and bottom members 3ª and 4ª, are secured in assembled relation by tongue and groove joints, preferably of the identical form above described, the construction will be understood without the necessity of repeating the description of the joints.

An added feature of the solid walled box, consists in forming an inward bevel, indicated at 13, on the meeting edges of the members, to reinforce the action of the tongue and groove joints in releasably securing the members assembled and also to give a finished appearance to the box by avoiding exposure of cross-cut ends of the box material, which are difficult to finish and stand out more or less prominently after the box has been in use a short time.

Several modifications of the above described tongue and groove lock joint are shown in Figs. 13, 14 and 15, in which opposing grooves are formed in registering relation in the box members to be joined and the tongue is in the form of a strip of approximately X-shaped cross section, which is divided lengthwise into a main section 14 and an auxiliary section 15. The main section, when inserted in the grooves, serves to join the box members and the auxiliary section, when entered between adjoining sides of the main section and the grooves, releasably locks the main section against withdrawal.

In Fig. 13, the upper half portion of the tongue strip and the groove it enters in the top member are of trapezoidal form in cross section with one outwardly inclined side and the lower half portion is of dovetail form. The locking key strip is inserted between the adjoining inclined sides of the tongue strip and the groove.

In Fig. 14, the upper and the lower half portions of the tongue strip and the registering grooves it enters, are of dovetail form in cross section and as the tongue strip completely fills the grooves, a locking key strip is not required.

In Fig. 15, both the upper and the lower halves of the tongue strip are of trapezoidal form in cross section and the registering grooves are similarly formed to receive the strip but are of somewhat increased width to admit a locking key strip between the adjoining inclined sides of the grooves and the tongue strip.

With further reference to the Fig. 3 modification, as shown, the side member of the crate is broken out centrally, leaving forward and rearward end portions thereof. For purposes of illustration, only the forward portion of the side member is shown depressed, as described, to expose the groove in the end member, for the insertion of the locking strip. The rear portion is shown returned to normal position, after the side member has been depressed and the locking strip inserted. It may also be added that the lower ends of the tongues of the side member are suitably bevelled, to come to a full bearing on the bottom slat when the side member is depressed.

As the many important advantages of the invention will be apparent from the foregoing, it will not be necessary to list and describe the same at length.

We claim:

1. A knockdown container comprising sides, ends and top and bottom members secured in assembled relation by releasable joints, the joints that secure the top member to the body of the container serving unaided as the only fastenings for the same and consisting of engaging tongues and grooves of similar cross sectional form having one inclined side, the tongues projecting from the under side of the top member and the grooves formed in the upper edge of the body members opening upward and dimensioned to receive the tongues from above by downward movement of the top member and strip members shaped to extend the inclined side of the tongues by being removably inserted between the same and the adjoining inclined side of each groove, to tighten the joints and render them resistant to the release of the top member.

2. A knockdown container comprising container body members, a top cover member secured at its opposite ends to the container body members by releasable fastenings that serve unaided as the only fastenings for the same and consist of engaging tongues and grooves of suitable cross section having one inclined side, the tongues projecting from the under side of the top cover member and the grooves formed in the upper edge of the body members opening upward and of sufficient width to receive the tongues from above by downward entrance, and a strip member inserted between the inclined side of each groove and the adjoining inclined side of the tongue therein to tighten the joint and render it resistant to the release of the cover.

3. A knockdown container, as set forth in claim 2, in which the engaged tongues and grooves are of substantially identical formation in cross section and relatively proportioned to provide a space between the inclined side of each groove and the adjoining inclined side of the tongue therein for the reception of the strip member.

4. A knockdown container as set forth in claim 2, in which the engaged tongues and grooves are of substantially identical formation in cross section and relatively proportioned to provide a space closed on all four sides between the inclined side of each groove and the adjoining inclined side of the tongue therein for the reception of the strip member.

5. A knockdown container, as set forth in claim 2, in which each groove is of trapezoidal form in cross section with one inclined side and the tongue and strip member therein are relatively proportioned to combine and completely fill the groove.

6. A knockdown container, as set forth in claim 2, in which each groove is of trapezoidal form in cross section with one side inclined inwardly toward the interior of the container and wherein the tongue and strip member therein are relatively proportioned to combine and completely fill the groove.

7. In a knockdown crate, crate body members, a top cover member sufficiently flexible to be bowed over the projecting contents of the crate and secured at its opposite ends to said crate body members by releasable fastenings, the aforesaid fastenings consisting of engaging tongues and grooves of suitable cross section having one inclined side, the tongues projecting from the under side of the cover member and the grooves in the body members opening upward and of sufficient width to receive the tongues from above by downward entrance and a strip member inserted between the inclined side of each groove and the adjoining inclined side of the tongue therein to tighten the joint and render it resistant to the release of the cover.

8. In a knockdown crate, crate body members, a flexible slatted cover member adapted to be bowed over projecting contents of the crate and secured at its opposite ends to said crate body members by releasable fastenings, the aforesaid fasteners consisting of engaging tongues and grooves of trapezoidal cross section with one inclined side, the tongues projecting downward from the under side of the cover member and the grooves in the body members formed in the upper edges thereof being of sufficient width to receive the tongues by downward movement from above and a flat locking strip of uniform width and thickness throughout its length, inserted between the inclined side of each groove and the adjoining inclined side of the tongue therein to tighten the joint and render it resistant to the release of the cover.

CHARLES H. McGRATH.
ROGER L. WEBSTER.

REFERENCES CITED

The following references are of record in the file of this patent:

UNITED STATES PATENTS

| Number | Name | Date |
| --- | --- | --- |
| 653,514 | Kasschau | July 10, 1900 |
| 706,763 | Lange | Aug. 12, 1902 |
| 1,022,098 | Long | Apr. 2, 1912 |
| 1,209,027 | Quade | Dec. 19, 1916 |
| 1,581,518 | Mount | Apr. 20, 1926 |